J. CLUBB.
Fifth-Wheel for Carriages.
No. 164,426.
Patented June 15, 1875.
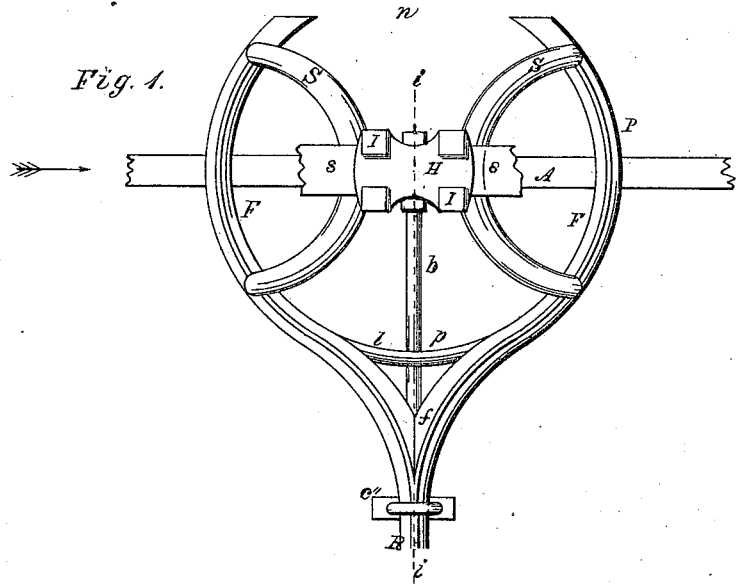
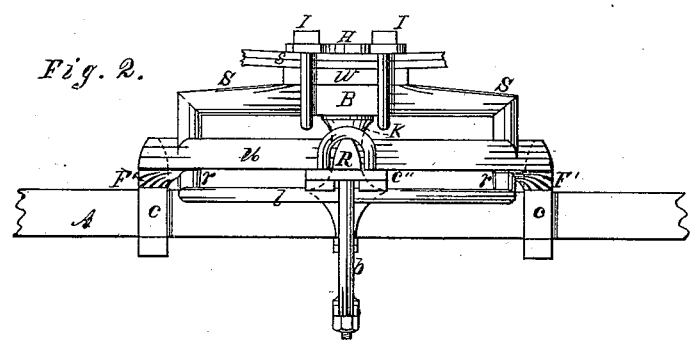
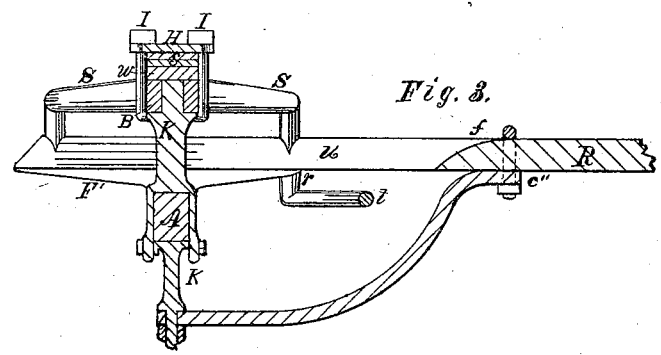
Witnesses:
E. B. Whitmore
O. A. Smith
Inventor:
John Clubb, by
B. F. Parsons his Atty.

UNITED STATES PATENT OFFICE.

JOHN CLUBB, OF SENECA, NEW YORK.

IMPROVEMENT IN FIFTH-WHEELS FOR CARRIAGES.

Specification forming part of Letters Patent No. 164,426, dated June 15, 1875; application filed December 22, 1874.

*To all whom it may concern:*

Be it known that I, JOHN CLUBB, of the town of Seneca, in the county of Ontario and State of New York, have invented a new and useful Improvement in Fifth-Wheels for Light Carriages; and I do hereby declare that the following is a full and exact description of the construction and operation of the same, reference being had to the drawings accompanying this specification, and to the figures and letters of reference marked thereon, in which like letters refer to like parts throughout the same, and on which—

Figure 1 represents a plan of the improvement. Fig. 2 represents a vertical transverse section through the axle. Fig. 3 represents a longitudinal section through the dotted line $i\ i$.

This improvement relates to reaches, fifth-wheels, and head-blocks of buggies and light carriages. Ordinarily the rim of a fifth-wheel in the rear of the king-bolt is a continuous circle. The reach is of wood, and longitudinally strapped with iron for strengthening the same. It is connected to the fore-wheels by extending forward to the king-bolt, which passes through the reach, and it is bolted to the upper half of the rim of the fifth-wheel where it crosses the rim, thus securing the successful operation of the vehicle. Through the axle and head-block, which rests upon the axle, passes the king-bolt, securing the reach, and at the same time furnishes a bed for the spring of the vehicle. The nature of my invention consists in the combination of the parts constituting an improved fifth-wheel, as hereinafter set forth.

The lower half F' of the fifth-wheel F is supported upon the axle A by the usual clips $c$. About one-fourth of its rim, P, in front, and one-third of the same in the rear, at $p$, are cut out of the rim, but that part in the rear, $p$, is, by a set-off, $r$, dropped about an inch below the rim, and then continued as a round rod, $l$, completing the connection between the otherwise-dissevered parts of the rim, shown at Fig. 2, thus securing the desired strength, at the same time the impinging surfaces of the upper and lower halves of the wheel are delivered of the friction consequent upon a continuous rim. The upper half U of the rim is made solid with and out of the solid-metal reach R. For this object the reach is of the size and length suitable for the same, and halved or split from the front opening at $n$ back to the fork $f$, from which, out to the front at $n$, the two halves or prongs of the fork are shaped to fit the lower half F' of the rim, leaving the gap in front, as in the lower half, all being wholly of wrought-iron. Resting on this fifth-wheel rim, directly over the axle, but rising solidly out of and about an inch above the rim, are two metal horizontal segments, S, of any preferred radius, whose peripheries, directly over the axle, are solidly connected by the rectangular metal block B, thus solidly uniting the two convex edges of the segments, and constituting the whole a strong rigid frame-work for a head-block, H, and forming a bed for the front carriage-springs, and through which passes the king-bolt K. $w$ is a wood bolster for building up the bed B for the front spring, and to receive the terminal point and nut of the king-bolt, all of which are secured to the block by the clips I. The lower portion of the king-bolt is made into a clip, $c'$, resting upon, and at the same time clasping, the axle, and is secured on the under edge of the same in the usual manner. From this last-named clip $c'$ a bolt, K', is appended for receiving the front end of the brace $b$, the rear end being attached to the reach R at the fork $f$ by the clip $c''$, which takes the place of the ordinary bolt and nut, and prevents the weakening effect of the bolt-hole through the body of the reach.

By constructing the reach, fifth-wheel, and head-block in the manner as herein described the deteriorating effect of the bolt and rivet perforations in and through the different parts of the same is avoided, the ordinary wood head-block is superseded, and, all the different parts being of wrought metal and solidly welded together, the parts are smaller, requiring less material, but still stronger, and require less labor, consequently the construction is cheaper, appears more graceful, and has a better general appearance than those in common use.

As the method of affixing and attaching the king-bolt as herein described has been used before my invention, and the clips are none of them new, I do not claim either or any of them; but

What I claim as my invention, and for which I pray of the United States Patent Office Letters Patent, is—

The combination of the upper half U of the fifth-wheel F, formed by halving an extenson of the reach R, the head-block H, consisting of the segments S, united by the rectangular block B, and solid with the rim P, with the lower half F', clip c'', and brace b, all arranged for the purpose substantially as herein set forth.

In testimony whereof I have hereunto set my hand on this 14th day of December, A. D. 1874.

JOHN CLUBB.

Witnesses:
 A. C. PARSONS,
 FRANK KINGSLEY.